(12) United States Patent
Iijima et al.

(10) Patent No.: US 12,424,912 B2
(45) Date of Patent: Sep. 23, 2025

(54) MOTOR ROTOR WITH END RING

(71) Applicant: IHI Corporation, Tokyo (JP)

(72) Inventors: Kai Iijima, Tokyo (JP); Naoki Oiwa, Tokyo (JP); Natsuki Yoneyama, Tokyo (JP); Yuji Sasaki, Tokyo (JP); Yoshihito Katsu, Tokyo (JP); Hikaru Sugiura, Tokyo (JP)

(*) Notice: Subject to any disclaimer, the term of this patent is extended or adjusted under 35 U.S.C. 154(b) by 184 days.

(21) Appl. No.: 18/169,210

(22) Filed: Feb. 15, 2023

(65) Prior Publication Data

US 2023/0198355 A1 Jun. 22, 2023

Related U.S. Application Data

(63) Continuation of application No. PCT/JP2021/033514, filed on Sep. 13, 2021.

(30) Foreign Application Priority Data

Sep. 30, 2020 (JP) .................................. 2020-165146

(51) Int. Cl.
  *H02K 1/27* (2022.01)
  *H02K 1/28* (2006.01)
  *H02K 15/03* (2006.01)
  *H02K 15/12* (2006.01)

(52) U.S. Cl.
  CPC .............. *H02K 15/03* (2013.01); *H02K 1/27* (2013.01); *H02K 1/28* (2013.01); *H02K 15/12* (2013.01)

(58) Field of Classification Search
  CPC ............ H02K 15/03; H02K 1/27; H02K 1/28; H02K 15/12; H02K 1/2733
  See application file for complete search history.

(56) References Cited

U.S. PATENT DOCUMENTS

| 2010/0295402 A1* | 11/2010 | Miyashita ............ H02K 1/2753 310/156.28 |
| 2012/0049661 A1 | 3/2012 | Ions et al. |
| 2013/0009494 A1 | 1/2013 | Oguma |

(Continued)

FOREIGN PATENT DOCUMENTS

| CN | 102868244 | 1/2013 |
| CN | 103181062 | 6/2013 |

(Continued)

OTHER PUBLICATIONS

International Search Report dated Nov. 9, 2021 for PCT/JP2021/033514.

(Continued)

*Primary Examiner* — Thomas Truong
(74) *Attorney, Agent, or Firm* — SOEI PATENT & LAW FIRM

(57) ABSTRACT

A motor rotor includes a shaft body, a cylindrical magnet covering an outer circumferential surface of the shaft body, a cylindrical protective layer covering an outer circumferential surface of the magnet and an annular end ring having the shaft body inserted therethrough, and in contact with an end surface of the magnet. The end ring is fixed to the shaft body by an inner circumferential resin portion formed between an inner circumferential surface of the end ring and the outer circumferential surface of the shaft body.

20 Claims, 5 Drawing Sheets

(56) References Cited

U.S. PATENT DOCUMENTS

| | | | | |
|---|---|---|---|---|
| 2013/0187487 | A1* | 7/2013 | Honda | H02K 1/28 |
| | | | | 310/43 |
| 2014/0183777 | A1 | 7/2014 | Ions et al. | |
| 2018/0352659 | A1* | 12/2018 | Hayashi | H05K 3/0064 |
| 2020/0119606 | A1* | 4/2020 | Murakami | H02K 15/12 |
| 2020/0227962 | A1* | 7/2020 | Ogihara | H02K 1/278 |
| 2022/0021255 | A1* | 1/2022 | Iijima | H02K 1/2733 |
| 2022/0029487 | A1 | 1/2022 | Sugiura et al. | |

FOREIGN PATENT DOCUMENTS

| | | |
|---|---|---|
| DE | 3622231 | 1/1988 |
| JP | S58-012562 | 1/1983 |
| JP | 2010-172095 | 8/2010 |
| JP | 2010172095 A * | 8/2010 |
| JP | 2010-200456 | 9/2010 |
| JP | 2013-150494 | 8/2013 |
| JP | 2015-211612 | 11/2015 |
| JP | 2016-208724 | 12/2016 |
| WO | 2012/025731 | 3/2012 |
| WO | 2020/022017 | 1/2020 |
| WO | 2020/209051 | 10/2020 |

OTHER PUBLICATIONS

International Preliminary Report on Patentability with Written Opinion dated Apr. 13, 2023 for PCT/JP2021/033514.

* cited by examiner

MOTOR ROTOR WITH END RING

CROSS-REFERENCE TO RELATED APPLICATIONS

This application is a continuation application of PCT Application No. PCT/JP2021/033514, filed on Sep. 13, 2021, which claims the benefit of priority from Japanese Patent Application No. 2020-165146, filed on Sep. 30, 2020. The entire contents of the above listed PCT and priority applications are incorporated herein by reference.

BACKGROUND

Field

The present disclosure relates to a motor rotor and a method for manufacturing the motor rotor.

Description of the Related Art

A motor rotor having a permanent magnet is described in Japanese Unexamined Patent Publication No. S58-12562, in which permanent magnets are embedded in a resin material.

SUMMARY

Disclosed herein is an example rotary machine. The motor rotor includes a shaft body, a cylindrical magnet covering an outer circumferential surface of the shaft body, a cylindrical protective layer covering an outer circumferential surface of the magnet, and an annular end ring having the shaft body inserted therethrough, and in contact with an end surface of the magnet. The end ring is fixed to the shaft body by an inner circumferential resin portion formed between an inner circumferential surface of the end ring and the outer circumferential surface of the shaft body.

DETAILED DESCRIPTION

Figure 1:
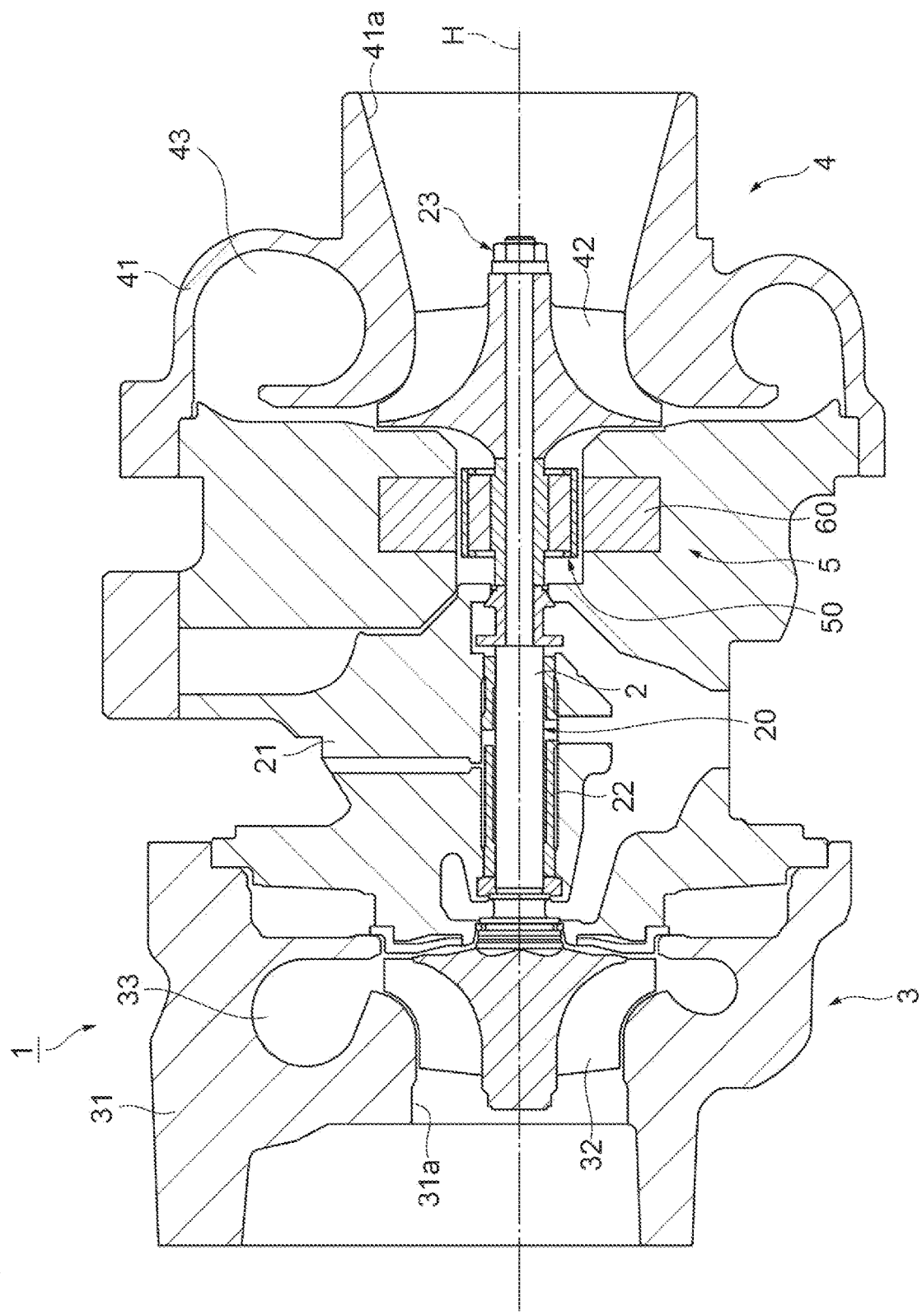
FIG. 1 is a cross-sectional view illustrating a turbocharger including a motor rotor of the present disclosure.

In the following description, with reference to the drawings, the same reference numbers are assigned to the same components or to similar components having the same function, and overlapping description is omitted.

An example of the present disclosure includes a shaft body, a cylindrical magnet covering an outer circumferential surface of the shaft body, a cylindrical protective layer covering an outer circumferential surface of the magnet, and an annular end ring having the shaft body inserted therethrough, and in contact with an end surface of the magnet. The end ring is fixed to the shaft body by an inner circumferential resin portion formed between an inner circumferential surface of the end ring and the outer circumferential surface of the shaft body.

The end ring of the motor rotor can be used as a weight for adjusting rotational balance. When adjusting the rotational balance, the greater the distance of a mass point from the rotational axis, the greater the effect of adjustment of the rotational balance obtained by adjusting the mass. The smaller the distance of the mass point from the rotational axis, the smaller the effect of adjustment of the rotational balance obtained by adjusting the mass. The end ring of the motor rotor is fixed to the shaft body by the inner circumferential resin portion. According to this configuration, for example, the end ring which has a large mass is disposed in a location that is far from the rotational axis and is thus effective for adjusting the rotational balance. The inner circumferential resin portion which has a small mass is disposed in a location that is close to the rotational axis and is thus less effective for adjusting the rotational balance. As a result, an adjustment margin of the end ring, which is a weight, can be reduced. As a result, a light end ring can be used. For example, the motor rotor can be reduced in weight by employing the inner circumferential resin portion. Thus, the mass of the motor rotor can be reduced.

In one example, the end ring may include an adjustment mark.

In one example, the density of a material constituting the end ring may be greater than the density of a material constituting the inner circumferential resin portion. This configuration enables the motor rotor to be reduced in weight.

In one example, the length of the protective layer along an axis of the shaft body may be greater than the length of the magnet along the axis of the shaft body. This configuration enables the magnet to be protected by the protective layer. The end ring can also be protected by the protective layer.

In one example, the entire inner end surface of the end ring may face the end surface of the magnet. This configuration enables the end ring to be disposed in a location away from the rotational axis.

In one example, an outer circumferential resin portion may be provided between an outer circumferential surface of the end ring and an inner circumferential surface of the protective layer. This configuration enables the end ring to be protected by the protective layer.

In one example, the outer circumferential resin portion may include a first portion provided between the outer circumferential surface of the end ring and the inner circumferential surface of the protective layer, and a second portion extending from the first portion along an outer end surface of the end ring. This configuration enables the end ring to be fixed to the magnet.

Another example of the present disclosure includes a disposing a shaft body in a mold, a disposing, in the mold, a cylindrical magnet covering an outer circumferential surface of the shaft body, and an annular end ring so as to be in contact with an end surface of the magnet, the end ring having the shaft body inserted therethrough, and a injecting an uncured resin material between the outer circumferential surface of the shaft body and an inner circumferential surface of the magnet, and between the outer circumferential surface of the shaft body and an inner circumferential surface of the end ring. This manufacturing method enables the manufacturing of a motor rotor that can adjust rotational balance and reduced weight of the motor rotor. For example, the magnet and the end ring may be able to be formed in a single injecting.

FIG. 1 is a diagram illustrating a cross-section including a rotational axis H of an example turbocharger 1. The turbocharger 1 is a variable capacity turbocharger including the motor rotor of the present disclosure. An "axial direction" in the following description refers to the axial direction of a rotating shaft 2 described further below. A "radial direction" refers to the radial direction of the rotating shaft 2. A "circumferential direction" refers to the circumferential direction of the rotating shaft 2.

The turbocharger 1 is applied to an internal combustion engine mounted on a vehicle or the like. As illustrated in FIG. 1, the turbocharger 1 includes a turbine 3 and a compressor 4. The turbine 3 includes a turbine housing 31 and a turbine wheel 32. The turbine wheel 32 is contained in the turbine housing 31. The turbine housing 31 has a scroll passage 33 that is disposed around the turbine wheel 32. The scroll passage 33 extends in the circumferential direction. The compressor 4 includes a compressor housing 41 and a compressor wheel 42. The compressor wheel 42 is contained in the compressor housing 41. The compressor housing 41 has a scroll passage 43 that is disposed around the compressor wheel 42. The scroll passage 43 extends in the circumferential direction.

The turbine wheel 32 is mounted on one end of the rotating shaft 2. The compressor wheel 42 is mounted on the other end of the rotating shaft 2. A bearing housing 21 is provided between the turbine housing 31 and the compressor housing 41. The rotating shaft 2 is rotatably supported by the bearing housing 21 via a bearing 22. The rotating shaft 2, the turbine wheel 32, and the compressor wheel 42 rotate about the rotational axis H as a unitary rotor 23.

The turbine housing 31 is provided with an exhaust gas inlet and an exhaust gas outlet 31a. Exhaust gas discharged from the internal combustion engine flows into the turbine housing 31 through the exhaust gas inlet. The exhaust gas flown into the turbine housing 31 flows into the turbine wheel 32 through the scroll passage 33. The exhaust gas flown into the turbine wheel 32 causes the turbine wheel 32 to rotate. The exhaust gas that causes the turbine wheel 32 to rotate flows out from the turbine housing 31 through the exhaust gas outlet 31a.

The compressor housing 41 is provided with an inlet port 41a and an outlet port. When the turbine wheel 32 rotates, the compressor wheel 42 rotates via the rotating shaft 2. The rotating compressor wheel 42 sucks in outside air through the inlet port 41a. The air sucked in is compressed while passing through the compressor wheel 42 and the scroll passage 43. The compressed air is discharged from the outlet port. The compressed air discharged from the outlet port is supplied to the internal combustion engine.

The turbocharger 1 includes an electric motor 5. The electric motor 5 applies torque to the rotating shaft 2 to supplement insufficient torque when the torque of the rotating shaft 2 is insufficient such as during acceleration of the vehicle. The electric motor 5 is, for example, a brushless AC motor. The electric motor 5 includes a motor rotor 50 which is a rotating component and a motor stator 60 which is a stationary component. The electric motor 5 can use batteries of the vehicle as its drive source. The electric motor 5 may regenerate power by the rotation energy of the rotor 23. The electric motor 5 may be configured to accommodate a high-speed rotation of the rotating shaft 2. High-speed rotation is, for example, about 100,000 to 200,000 rpm.

The motor rotor 50 is disposed between the bearing 22 and the compressor wheel 42 in the axial direction. The motor rotor 50 is fixed to the rotating shaft 2. The motor rotor 50 is rotatable together with the rotating shaft 2. The motor stator 60 is accommodated in the bearing housing 21. The motor stator 60 surrounds the motor rotor 50 in the circumferential direction. The motor stator 60 includes coils and iron cores. The motor stator 60 generates a magnetic field by an electric current supplied to the coils. A force in the circumferential direction acts on the motor rotor 50 due to the magnetic field generated by the motor stator 60. As a result, torque is applied to the rotating shaft 2.

Figure 2:
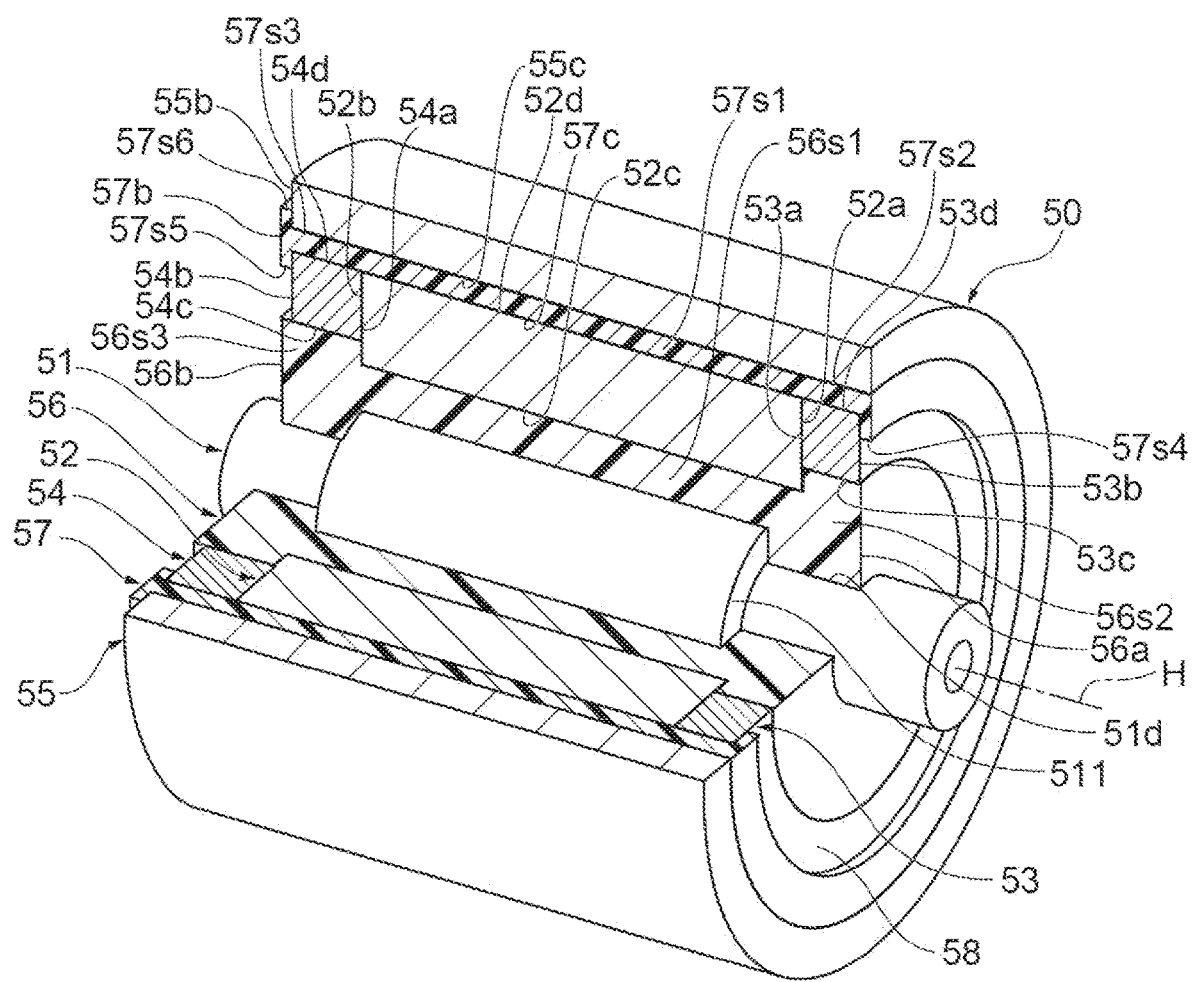
FIG. 2 is a perspective view illustrating an example structure of the motor rotor.

The motor rotor 50 will be described with reference to FIG. 2. The motor rotor 50 has an inner sleeve 51, a permanent magnet 52, an end ring 53, an end ring 54, a protective layer 55, an inner circumferential resin portion 56 (e.g., inner resin portion), and an outer circumferential resin portion 57 (e.g., resign portion, outer resin portion).

The inner sleeve 51 constitutes a shaft body 20 together with the rotating shaft 2. The inner sleeve 51 has a large diameter portion 511 which is formed to have a somewhat large diameter. The large diameter portion 511 is provided in the center portion in the axial direction. For example, steel such as SCM435H may be employed as the material for the inner sleeve 51.

The cylindrical permanent magnet 52 is disposed around the large diameter portion 511. A groove extending in the axial direction may be formed having regular intervals in the circumferential direction on an outer circumferential surface (e.g., outer cylindrical surface) of the permanent magnet 52. The length of the permanent magnet 52 in the axial direction is substantially the same as the length of the large diameter portion 511 in the axial direction. For example, neodymium magnet (Nd—Fe—B) or samarium cobalt magnet may be employed as the material for the permanent magnet 52. The permanent magnet 52 is covered by the inner circumferential resin portion 56 and the outer circumferential resin portion 57. As a result, the permanent magnet 52 is protected from the external environment.

The protective layer 55 is a cylindrical member. The protective layer 55 may be referred to as an "armor ring." The cylindrical protective layer 55 is disposed around the permanent magnet 52. The protective layer 55 prevents fragments from scattering in the radial direction in the event that the permanent magnet 52 is damaged. The protective layer 55 suppresses distortion of the permanent magnet 52 and reduces the possibility of damage of the permanent magnet 52. The protective layer 55 thus has a certain degree of rigidity. The length of the protective layer 55 in the axial direction is greater than the length of the permanent magnet 52 in the axial direction. The length of the protective layer 55 in the axial direction is greater than the length of the large diameter portion 511 in the axial direction. A metal material or a resin material may be employed as the material for the protective layer 55. The metal material may include non-magnetic metal such as titanium (for example, Ti-6A1-4V). The resin material may include carbon fiber reinforced plastic (CFRP) and the like.

The end ring 53 and the end ring 54 sandwich the permanent magnet 52 in a direction of the rotational axis H. The length of a component including the end ring 53, the end ring 54, and the permanent magnet 52 is roughly the same as the length of the protective layer 55. The end ring 53 and the end ring 54 are ring-shaped. The end ring 53 has an inward-facing end surface 53a (inner end surface), an outward-facing end surface 53b (outer end surface), a ring inner circumferential surface 53c, and a ring outer circumferential surface 53d. The end ring 54 has an inward-facing end surface 54a (inner end surface), an outward-facing end surface 54b (outer end surface), a ring inner circumferential surface 54c, and a ring outer circumferential surface 54d.

The density of the material of the end ring 53 and the end ring 54 is greater than the density of the material of the inner circumferential resin portion 56 described further below. The materials for the end ring 53, the end ring 54, and the inner circumferential resin portion 56 may be selected to achieve this quantitative relationship between the densities. For example, non-magnetic metal such as SUS, thermosetting resin, and thermoplastic resin may be employed as the material for the end ring 53 and the end ring 54.

The annular end ring 53 is in contact with a first magnet end surface 52a of the permanent magnet 52. The inward-facing end surface 53a of the end ring 53 is in contact with the first magnet end surface 52a of the permanent magnet 52. In some examples, the inward-facing end surface 53a may be fixed with the first magnet end surface 52a. For example, the inward-facing end surface 53a may be adhered to the first magnet end surface 52a. In other examples, the inward-facing end surface 53a may abut the first magnet end surface 52a, without being adhered together. In an example of FIG. 2, the diameter of the ring outer circumferential surface 53d is the same as the diameter of a magnet outer circumferential surface 52d (e.g., outer cylindrical surface) of the permanent magnet 52. The ring outer circumferential surface 53d is flush with the magnet outer circumferential surface 52d. The diameter of the ring inner circumferential surface 53c is greater than the diameter of a magnet inner circumferential surface 52c. The ring inner circumferential surface 53c is not flush with the magnet inner circumferential surface 52c. There is a step between the ring inner circumferential surface 53c and the magnet inner circumferential surface 52c. In such a configuration, the ring inner circumferential surface 53c is not directly in contact with a sleeve outer circumferential surface 51d. There is a gap between the ring inner circumferential surface 53c and the sleeve outer circumferential surface 51d. The gap between the ring inner circumferential surface 53c and the sleeve outer circumferential surface 51d is filled with the inner circumferential resin portion 56.

The relationship between the permanent magnet 52 and the end ring 53 is not limited to the above relationship. An inner portion of the inward-facing end surface 53a maybe closer to the rotational axis H than the magnet inner circumferential surface 52c of the permanent magnet 52. The diameter of the ring inner circumferential surface 53c may be smaller than the diameter of the magnet inner circumferential surface 52c of the permanent magnet 52. An outer portion of the inward-facing end surface 53a may be further away from the rotational axis H than the magnet outer circumferential surface 52d of the permanent magnet 52. The diameter of the ring outer circumferential surface 53d may be greater than the diameter of the magnet outer circumferential surface 52d of the permanent magnet 52.

The inner circumferential resin portion 56 is bonded to the ring inner circumferential surface 53c. The end ring 53 is fixed to the inner sleeve 51 by the inner circumferential resin portion 56. The outer circumferential resin portion 57 is bonded to the ring outer circumferential surface 53d. The end ring 53 is fixed to the protective layer 55 by the outer circumferential resin portion 57. The outer circumferential resin portion 57 is also bonded to a portion of the outward-facing end surface 53b on an outer circumferential side. In an example of FIG. 2, an inner circumferential side of the outward-facing end surface 53b is an exposed surface. The inner circumferential side of the outward-facing end surface 53b is not provided with a resin portion or the like.

The end ring 54 is in contact with a second magnet end surface 52b of the permanent magnet 52. The inward-facing end surface 54a of the end ring 54 is in contact with the second magnet end surface 52b of the permanent magnet 52. The detailed configuration of the end ring 54 is the same as that of the end ring 53. Thus, a detailed description of the end ring 54 is omitted.

There is a small gap between the inner sleeve 51 and the permanent magnet 52. The inner circumferential resin portion 56 is formed in the gap. As a result, the sleeve outer circumferential surface 51d of the inner sleeve 51 is covered by the inner circumferential resin portion 56. The magnet inner circumferential surface 52c is covered by the inner circumferential resin portion 56. The ring inner circumferential surface 53c of the end ring 53 is also covered by the inner circumferential resin portion 56. The ring inner circumferential surface 54c of the end ring 54 is also covered by the inner circumferential resin portion 56. The inner circumferential resin portion 56 includes a portion 56s1, a portion 56s2, and a portion 56s3. The portion 56s1 is disposed between the sleeve outer circumferential surface 51d and the magnet inner circumferential surface 52c. The portion 56s2 is disposed between the sleeve outer circumferential surface 51d and the ring inner circumferential surface 53c. The portion 56s3 is disposed between the sleeve outer circumferential surface 51d and the ring inner circumferential surface 54c. A first end surface 56a of the inner circumferential resin portion 56 may be flush with the outward-facing end surface 53b of the end ring 53. A second end surface 56b of the inner circumferential resin portion 56 may protrude from the outward-facing end surface 54b of the end ring 54. That is, a step may be formed between the second end surface 56b and the outward-facing end surface 54b.

There is a small gap between the permanent magnet 52 and the protective layer 55. The outer circumferential resin portion 57 is formed in the gap between the permanent magnet 52 and the protective layer 55. As a result, the magnet outer circumferential surface 52d of the permanent magnet 52 is covered by the outer circumferential resin portion 57. A protective layer inner circumferential surface 55c is covered by the outer circumferential resin portion 57. An inner circumferential side of a second protective layer end surface 55b of the protective layer 55 is also covered by the outer circumferential resin portion 57. The ring outer circumferential surface 53d of the end ring 53 is also covered by the outer circumferential resin portion 57. The ring outer circumferential surface 54d of the end ring 54 is also covered by the outer circumferential resin portion 57. An outer circumferential portion of the outward-facing end surface 53b of the end ring 53 is also covered by the outer circumferential resin portion 57. An outer circumferential portion of the outward-facing end surface 54b of the end ring 54 is also covered by the outer circumferential resin portion 57. The outer circumferential resin portion 57 includes a portion 57s1, a portion 57s2 (first portion), and a portion 57s3 (first portion). The portion 57s1 is disposed between the magnet outer circumferential surface 52d and the protective layer inner circumferential surface 55c. The portion 57s2 is disposed between the ring outer circumferential surface 53*d* and the protective layer inner circumferential surface 55*c*. The portion 57*s*3 is disposed between the ring outer circumferential surface 54*d* and the protective layer inner circumferential surface 55*c*. The outer circumferential resin portion 57 further includes a portion 57*s*4 (second portion). The portion 57*s*4 protrudes from the outward-facing end surface 53*b* of the end ring 53 at a first end surface side of the outer circumferential resin portion 57. The portion 57*s*4 covers a portion of the outward-facing end surface 53*b*. The outer circumferential resin portion 57 further includes a portion 57*s*5 and a portion 57*s*6. The portion 57*s*5 protrudes from the outward-facing end surface 54*b* of the end ring 54 at a second end surface side of the outer circumferential resin portion 57. The portion 57*s*5 covers a portion of the outward-facing end surface 54*b* of the end ring 54. The portion 57*s*6 also protrudes from the outward-facing end surface 54*b* of the end ring 54 at the second end surface side of the outer circumferential resin portion 57. The portion 57*s*6 covers a portion of the second protective layer end surface 55*b* of the protective layer 55.

The inner sleeve 51, the permanent magnet 52, the protective layer 55, the end ring 53, and the end ring 54 are integrally coupled together via the inner circumferential resin portion 56 and the outer circumferential resin portion 57. The inner circumferential resin portion 56 transmits torque from the permanent magnet 52 to the inner sleeve 51. The outer circumferential resin portion 57 transmits torque from the permanent magnet 52 to the protective layer 55. In the turbocharger 1, the torque transmitted from the permanent magnet 52 to the inner sleeve 51 is, for example, about 0.5 Nm. The torque transmitted from the permanent magnet 52 to the protective layer 55 is also, for example, about 0.5 Nm.

Thermosetting resin, thermoplastic resin, and the like may be employed as the material for the inner circumferential resin portion 56 and the outer circumferential resin portion 57. Phenol resin and epoxy resin which are thermosetting resin may be employed as the material for the inner circumferential resin portion 56 and the outer circumferential resin portion 57. Additionally, liquid crystal polymer (LCP) which is thermoplastic resin may be employed as the material for the inner circumferential resin portion 56 and the outer circumferential resin portion 57. In some examples, LCP may be selected as the material for the inner circumferential resin portion 56 and the outer circumferential resin portion 57 to provide greater fluidity during injection molding, and may be more readily available, as compared to other materials such as phenol resin. On the other hand, phenol resin may be used as the material for the inner circumferential resin portion 56 and the outer circumferential resin portion 57 when heat resistance, rigidity, and resistance to environment are to be prioritized, as compared to LCP. Epoxy resin has adhesive properties, and thus may also be used as the material for the inner circumferential resin portion 56 and the outer circumferential resin portion 57.

For example, the material of the inner circumferential resin portion 56 has a predetermined relationship with the material of the end ring 53. The density of the material of the inner circumferential resin portion 56 is less than the density of the material of the end ring 53.

Figure 3A:
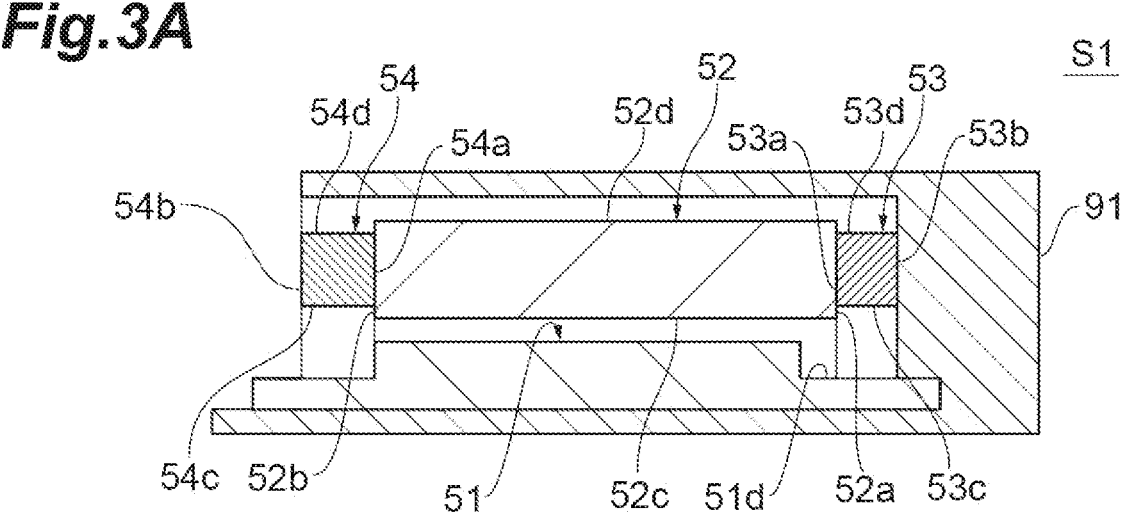
FIG. 3A is a diagram illustrating a manufacturing step of a motor rotor in which a mold is prepared.
Figure 3B:
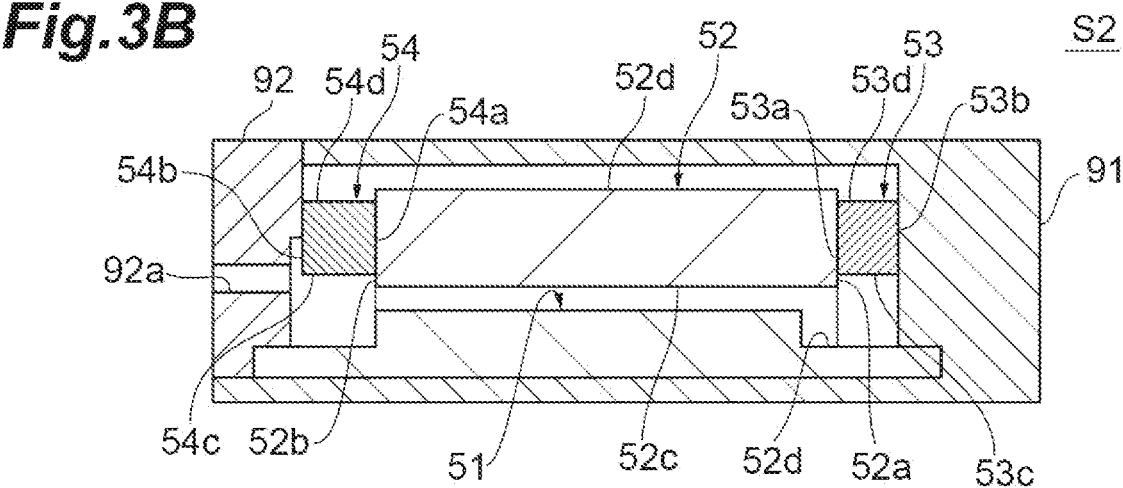
FIG. 3B is a diagram illustrating a manufacturing step of a motor rotor in which a lid is attached.

A method for manufacturing the motor rotor 50 will be described. As illustrated in FIG. 3A, a mold 91 is prepared. The inner sleeve 51 is then disposed inside the mold 91. The end ring 53, the permanent magnet 52, and the end ring 54 are then disposed inside the mold 91 (step/operation S1) in that order. When disposing the end ring 53, the permanent magnet 52, and the end ring 54, a gap is provided between the inner sleeve 51 and the permanent magnet 52. A gap is also provided between the inner sleeve 51 and the end ring 53. A gap is also provided between the inner sleeve 51 and the end ring 54. The end ring 53, the permanent magnet 52, and the end ring 53 may be disposed after the inner sleeve 51 has been disposed. Alternatively, the inner sleeve 51 may be disposed after the end ring 53, the permanent magnet 52, and the end ring 53 have been disposed. Next, as illustrated in FIG. 3B, a lid 92 is attached (step/operation S2). The lid 92 is provided with a hole 92*a*. The hole 92*a* is provided in the lid 92 for injecting an uncured resin material 56*s* which is to be the inner circumferential resin portion 56.

Figure 3C:
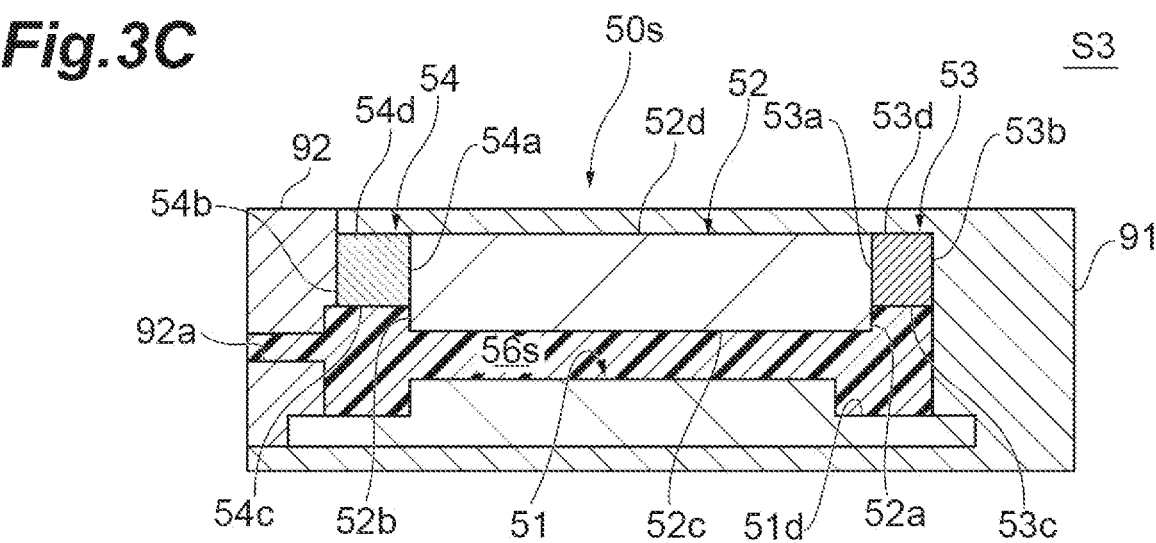
FIG. 3C is a diagram illustrating a manufacturing step of a motor rotor in which an uncured resin material is injected.
Figure 4A:
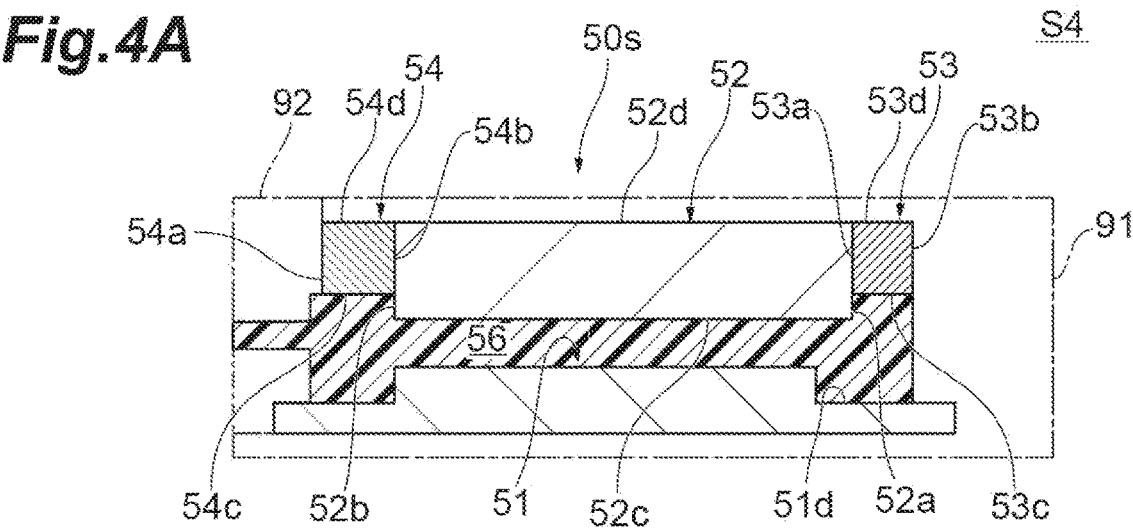
FIG. 4A is a diagram illustrating a manufacturing step of a motor rotor in which a sub-assembly is removed from the mold of FIG. 3A.

Next, as illustrated in FIG. 3C, the uncured resin material 56*s* is injected so as to form a layer of resin material (step/operation S3). When injecting the uncured resin material 56*s*, the mold 91 and the lid 92 are preheated to a predetermined temperature. The injected resin material 56*s* thus cures over time. A sub-assembly 50*s* is obtained when curing is completed. The sub-assembly 50*s* is the inner sleeve 51, the permanent magnet 52, the end ring 53, and the end ring 54 integrated by the inner circumferential resin portion 56. The sub-assembly 50*s* is then removed from the mold 91 after the lid 92 is removed (see FIG. 4A, (step/operation S4)).

Figure 4B:
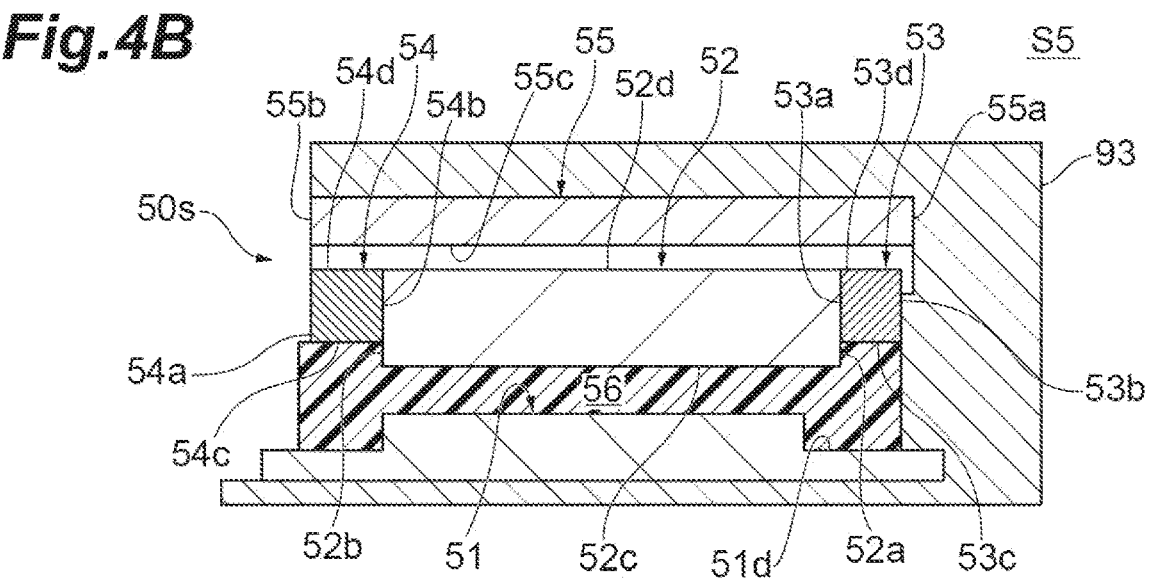
FIG. 4B is a diagram illustrating a manufacturing step of a motor rotor in which the sub-assembly of FIG. 4A is disposed in another mold.
Figure 4C:
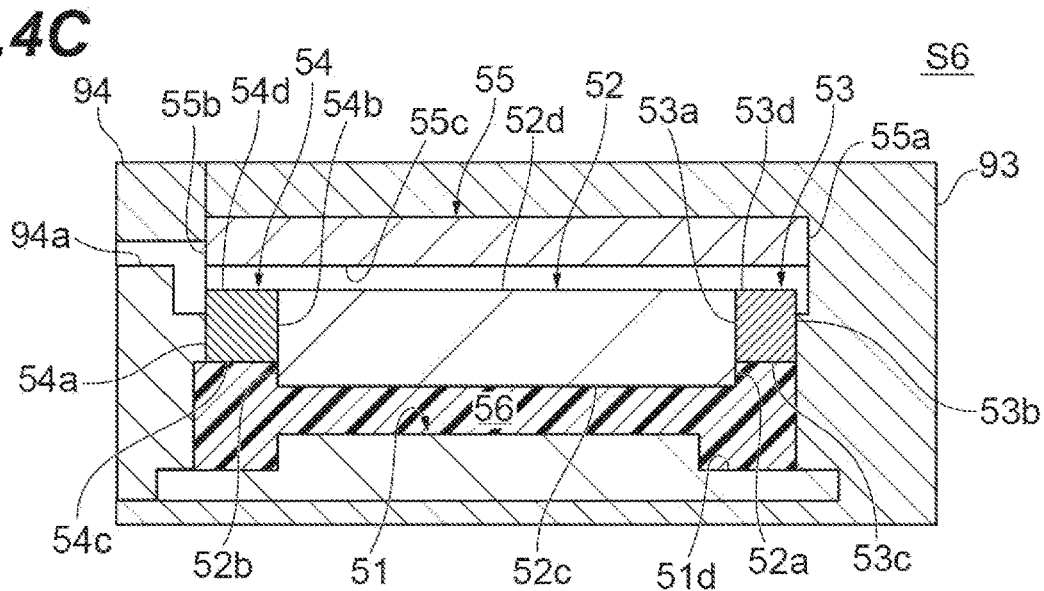
FIG. 4C is a diagram illustrating a manufacturing step of a motor rotor in which a lid is disposed.

Subsequently, as illustrated in FIG. 4B, the sub-assembly 50*s* is disposed in another mold 93 (step/operation S5). The protective layer 55 is then disposed in the mold 93 in which the sub-assembly 50*s* is disposed. Thereafter, a lid 94 is disposed as illustrated in FIG. 4C (step/operation S6). When the lid 94 is disposed, a gap is formed between the permanent magnet 52 and the protective layer 55. A gap is also formed between the end ring 53 and the protective layer 55. A gap is also formed between the mold 93 and the outer circumferential side of the outward-facing end surface 53*b* of the end ring 53 at a distal end. The inner circumferential side of the outward-facing end surface 53*b* is in contact with the mold 93. A gap is also formed between the lid 94 and an outer circumferential side of the outward-facing end surface 54*b* of the end ring 54 at a proximal end. The gap communicates with a hole 94*a* provided in the lid 94. The gap functions as a resin reservoir. The inner circumferential side of the second protective layer end surface 55*b* of the protective layer 55 is not in contact with the lid 94. An outer circumferential side of the second protective layer end surface 55*b* of the protective layer 55 is in contact with the lid 94.

Figure 5A:
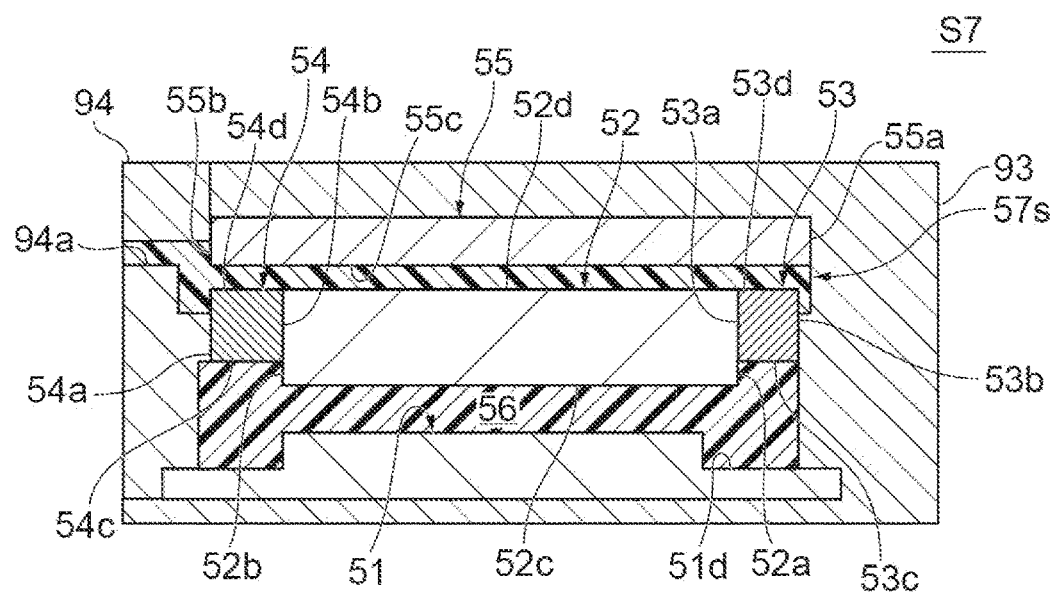
FIG. 5A is a diagram illustrating a manufacturing step of a motor rotor in which an uncured resin material is injected.
Figure 5B:
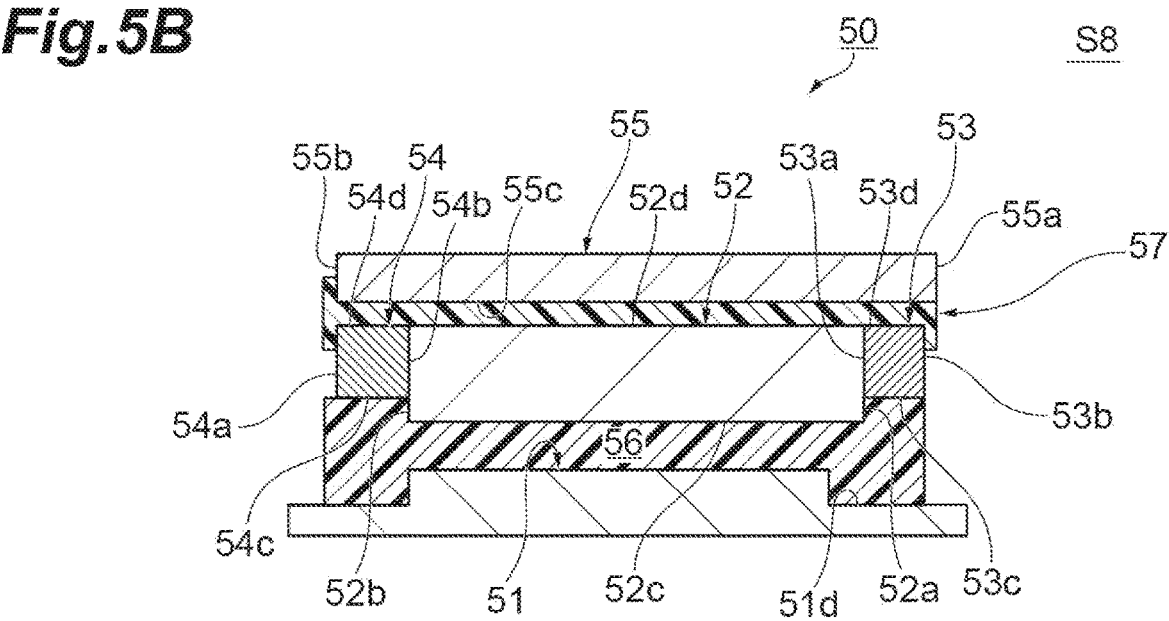
FIG. 5B is a diagram illustrating an example motor rotor in which a manufacturing step of curing has been completed.

Next, as illustrated in FIG. 5A, an uncured resin material 57*s* is injected so as to form a layer of resin material (step/operation S7). The mold 93 and the lid 94 are preheated to a predetermined temperature similarly to the step S3. The injected resin material 57*s* thus cures over time. FIG. 5B illustrates the motor rotor 50 when curing is completed (step/operation S8). The motor rotor 50 is the inner sleeve 51, the permanent magnet 52, the end ring 53, the end ring 54, and the protective layer 55 integrated by the inner circumferential resin portion 56 and the outer circumferential resin portion 57.

Electric compressors may be applied to two-stage turbocharger systems which achieve transient responsiveness and a wide range of properties. Electrically assisted turbochargers may be configured to regenerate excess turbine output during high loads. These electric compressors and electrically assisted turbochargers may utilize a predetermined number of revolutions for aerodynamics reasons. For example, the electric compressors may use a number of revolutions of about 100,000 rpm. In some examples, electrically assisted turbochargers may use a number of revolutions of about 200,000 rpm.

Electrified products for vehicles have stringent requirements of high efficiency, low noise, and space-saving. A surface permanent magnetic (SPM) motor may be selected to satisfy these requirements. An interior permanent magnet motor may be configured to obtain a high number of revolutions. The interior permanent magnet motor can be made to have multiple poles and slots. For example, motors and the like used in hybrid vehicles are marketed using the concept of having multiple poles and slots. However, the concept of having multiple poles and slots cannot be employed for electric compressors and electrically assisted turbochargers.

In some ultra-high speed SPM and small motors, a shaft is inserted into a cylindrical magnet, and a protective layer (armor ring) may be provided on the outer circumferential side of the cylindrical magnet to prevent scattering. These structures may be used to prevent damage to the magnet. Additionally, the armor rings may be designed to be light and thin while having high strength, and also to be non-magnetic.

Example motor rotors disclosed herein are applicable to electric compressors and electrically assisted turbochargers, and are economical and significantly reduce inertia due to several technological developments. Additionally, examples disclosed herein reduce inertia of the motor rotor so as to make it applicable to higher revolutions greater controllability.

The end ring 53 and the end ring 54 of the example motor rotor 50 can be used as weights for adjusting the rotational balance. When adjusting the rotational balance, the greater the distance of the weight for adjusting the rotational balance from the rotational axis H, the greater the effect of adjustment of the rotational balance obtained by adjusting the mass of the weight. Conversely, the smaller the distance of the weight for adjusting the rotational balance from the rotational axis H, the smaller the effect of adjustment of the rotational balance obtained by adjusting the mass of the weight. The end ring 53 and the end ring 54 of the motor rotor 50 are fixed to the inner sleeve 51 by the inner circumferential resin portion 56. Thus, the end ring 53 and the end ring 54 which have a large mass are disposed in locations that are far from the rotational axis H may be used to adjust the rotational balance. The inner circumferential resin portion 56 which has a small mass is disposed in a location that is close to the rotational axis H and is thus less effective for adjusting the rotational balance. As a result, employing the inner circumferential resin portion 56 enables weight reduction. Consequently, the mass of the motor rotor 50 can be reduced.

The end ring 53 and the end ring 54 can be used as machining allowances (balance land) when modifying the rotational balance following assembly. The closer to the outer circumferential side, the more effective the function as balance lands. In some examples, the end ring 53 and the end ring 54 are ring-shaped. The end ring 53 and the end ring 54 are integrated with the permanent magnet 52 by the injection molding of the resin material, and not by press fit. Thus, at the end rings, the portions close to the rotational axis H are replaced by the resin material. As a result, a weight corresponding to the volume of the resin material replacing the end rings and the density difference between the material of the end rings and the resin material is reduced. As a result, a lighter motor rotor 50 can be obtained. Additionally, a subsequent step of press fitting the end rings 53, 54 can be omitted. Consequently, it is economically superior.

The end ring 53 and the end ring 54 are balance lands. The end ring 53 and the end ring 54 may thus include an adjustment mark 58. An adjustment mark 58 is a trace showing where the balance has been adjusted. An adjustment mark 58 is, for example, a depression or a projection formed on the end ring 53 and the end ring 54. A depression and a projection are formed when adjusting the balance by partially shaving the end ring 53 and the end ring 54 to reduce the weight. Additionally, an adjustment mark is, for example, a heat mark. A heat mark is formed by the heat generated during machining to adjust the weight. Furthermore, an adjustment mark is, for example, the curvature of a machining groove and a discontinuous pattern of the machining groove caused by additional grinding of a member. Furthermore, an adjustment mark is a portion of the end ring 53 and the end ring 54 that is unbalanced with respect to the rotation about the rotational axis when the end ring 53 and the end ring 54 are rotated on their own.

It is to be understood that not all aspects, advantages and features described herein may necessarily be achieved by, or included in, any one particular example. Indeed, having described and illustrated various examples herein, it should be apparent that other examples may be modified in arrangement and detail. For example, the case in which the motor rotor 50 is applied to the electric motor 5 of the turbocharger 1 has been described as an example. The motor rotor 50 is also applicable to an electric compressor.

What is claimed is:

1. A motor rotor comprising:
   a shaft body;
   a cylindrical magnet covering an outer circumferential surface of the shaft body;
   a protective layer covering an outer cylindrical surface of the magnet, wherein the protective layer includes an end surface in an axial direction of the shaft body;
   an annular end ring in contact with an end surface of the magnet in the axial direction, wherein the shaft body is inserted through the end ring;
   an inner resin layer formed between an inner circumferential surface of the end ring and the outer circumferential surface of the shaft body; and
   an outer resin layer partially located between an outer circumferential surface of the end ring and an inner circumferential surface of the protective layer,
   wherein a first portion of the outer resin layer located outside of the protective layer in the axial direction that extends in a radial direction of the shaft body along the end surface of the protective layer.

2. The motor rotor according to claim 1, wherein the end ring includes an adjustment mark.

3. The motor rotor according to claim 1, wherein a density of a material constituting the end ring is greater than a density of a material constituting the inner resin layer.

4. The motor rotor according to claim 1, wherein a length of the protective layer in the axial direction is greater than a length of the magnet in the axial direction.

5. The motor rotor according to claim 1, wherein an entire inner end surface of the end ring faces the end surface of the magnet.

6. The motor rotor according to claim 1,
   wherein the end ring includes an end surface in the axial direction, and
   wherein the outer resin layer includes a second portion located outside of the protective layer in the axial direction that extends in the radial direction along the end surface of the end ring.

7. The motor rotor according to claim 6, wherein the second portion of the outer resin layer is spaced apart from the inner resin layer, and wherein the second portion forms a space along the end surface of the end ring between the of the second portion and the inner resin layer.

8. The motor rotor according to claim 1, wherein the outer resin layer is partially located between the protective layer and both of the magnet and the end ring.

9. The motor rotor according to claim 1, wherein the inner resin layer partially contacts the end surface of the magnet in the axial direction.

10. The motor rotor according to claim 1,
wherein the end ring is fixed to the shaft body by the inner resin layer, and
wherein the protective layer is fixed to the end ring by the outer resin layer.

11. A motor rotor comprising:
a shaft body;
a magnet covering an outer circumferential surface of the shaft body;
a protective layer covering an outer cylindrical surface of the magnet and including an end surface in an axial direction of the shaft body;
an end ring abutting an end surface of the magnet in the axial direction; and
a resin layer partially located between the protective layer and the end ring,
wherein the resin layer includes a portion located outside of the protective layer in the axial direction that extends in a radial direction of the shaft body along the end surface of the protective layer.

12. The motor rotor according to claim 11, wherein the resin layer is located between the protective layer and both of the magnet and the end ring.

13. The motor rotor according to claim 11, wherein the resin layer includes a second portion located outside of the end ring and abutting an end surface of the end ring in an axial direction.

14. The motor rotor according to claim 11, further comprising an inner resin layer located between the shaft body and the end ring.

15. The motor rotor according to claim 14, wherein the inner resin portion layer is located between the shaft body and both of the magnet and the end ring.

16. The motor rotor according to claim 11, wherein an entire inner end surface of the end ring abuts a part of the end surface of the magnet.

17. The motor rotor according to claim 11,
wherein the end ring includes:
a first end surface abutting the end surface of the magnet; and
a second end surface located opposite to the first end surface in the axial direction, and
wherein the portion of the resin layer is located outside of the second end surface in the axial direction that extends in the radial direction along the second end surface of the end ring.

18. The motor rotor according to claim 11, further comprising an inner resin layer located between the end ring and the shaft body.

19. The motor rotor according to claim 18,
wherein a density of a material constituting the end ring is greater than a density of a material constituting the inner resin layer, and
wherein the material of the end ring includes one or both of thermosetting resin and thermoplastic resin.

20. The motor rotor according to claim 11, wherein a length of the resin layer in the axial direction is greater than a length of the protective layer in the axial direction.

* * * * *